United States Patent [19]

Yagi et al.

[11] Patent Number: 5,233,402
[45] Date of Patent: Aug. 3, 1993

[54] COLOR IMAGE FORMING APPARATUS WITH IMPROVED COLOR IMAGE REGISTRATION

[75] Inventors: Michio Yagi; Takashi Tsutsumi; Masaru Nagai; Toyoaki Sugaya; Satoshi Haneda, all of Hachioji, Japan

[73] Assignee: Konica Corporation, Tokyo, Japan

[21] Appl. No.: 881,455

[22] Filed: May 11, 1992

[30] Foreign Application Priority Data

May 16, 1991 [JP] Japan ................... 3-111703
May 16, 1991 [JP] Japan ................... 3-111704

[51] Int. Cl.$^5$ ........................... G03G 15/01
[52] U.S. Cl. ................... 355/327; 346/108; 346/157; 355/208; 355/233
[58] Field of Search ............ 355/203, 204, 208, 233, 355/210–212, 326–328; 118/645; 346/108, 157

[56] References Cited

U.S. PATENT DOCUMENTS

| | | | |
|---|---|---|---|
| 5,083,141 | 1/1992 | Taguchi et al. | 346/108 |
| 5,087,928 | 2/1992 | Okino | 346/108 |
| 5,115,256 | 5/1992 | Miyagi et al. | 346/108 |
| 5,164,783 | 11/1992 | Taguchi et al. | 355/327 |

FOREIGN PATENT DOCUMENTS

| | | | |
|---|---|---|---|
| 60-75850 | 4/1985 | Japan. | |
| 60-76766 | 5/1985 | Japan. | |
| 60-95456 | 5/1985 | Japan. | |
| 60-95458 | 5/1985 | Japan. | |
| 60-158475 | 8/1985 | Japan. | |
| 61-100770 | 5/1986 | Japan. | |
| 61-149972 | 7/1986 | Japan. | |
| 4-16969 | 1/1992 | Japan | 355/233 |
| 2241347 | 8/1991 | United Kingdom | 355/233 |

*Primary Examiner*—A. T. Grimley
*Assistant Examiner*—William J. Royer
*Attorney, Agent, or Firm*—Frishauf, Holtz, Goodman & Woodward

[57] ABSTRACT

The color image forming machine such like a color printer or a color copier for forming a color image on a recording sheet. The image forming machine includes a photoreceptor belt; a belt driver for rotating the photoreceptor in a longitudinal direction; a laser beam scanner for repeatedly scanning the photoreceptor in a direction perpendicular to the longitudinal direction, with the laser beam, so that the latent image is formed on the photoreceptor; a developer for developing the latent image with plural color toners; a measuring unit for determining a rotation time of the photoreceptor; and a controller unit for controlling a scanning frequency of the laser beam scanner so that one scanning time of the laser beam scanner is set to the result of dividing the rotation time of the photoreceptor, while the photoreceptor rotates one round, by an integer.

10 Claims, 2 Drawing Sheets

COLOR IMAGE FORMING APPARATUS WITH IMPROVED COLOR IMAGE REGISTRATION

BACKGROUND OF THE INVENTION

The present invention relates to a color image forming apparatus which forms a latent image on a belt-shaped photoreceptor with an optical writing device using laser beams.

A large number of methods and apparatus have been proposed to form color images by the method of electrophotography.

For example, the following color image forming method is disclosed in the official gazette of Japanese Patent Application Open to Public Inspection No. 100770/1986: Latent images, the number of which corresponds to the number of color separation of a document image, are formed on a photoreceptor drum which functions as an image forming body. Images are transferred onto a transfer drum after each development so that a multicolor image can be formed on the transfer drum. After that, the multicolor image is transferred onto a recording paper and a color copy is obtained.

According to the aforementioned method, it is necessary to provide not only the photoreceptor drum but also the transfer drum, the circumferential surface of which is sufficiently large so that a sheet sized image can be transferred onto the surface. Therefore, it is unavoidable that the dimensions of the apparatus increase and further the structure of the apparatus becomes complicated.

For example, as disclosed in the official gazette of Japanese Patent Application Open to Public Inspection No. 149972/1986, there is a method for obtaining multicolor copies in such a manner that; a latent image is formed on a photoreceptor drum in accordance with the number of separated colors of a document image; and the image is transferred onto a transfer sheet each time when development is conducted. According to the aforementioned method, color images can not be superimposed accurately, so that a color image of high quality can not be provided.

Further, there is a method by which a multicolor image can be obtained in such a manner that; a latent image is repeatedly formed on a photoreceptor drum in accordance with the number of separated colors of a document image; the formed latent image is repeatedly developed with color toner so that color toner images are superimposed on the photoreceptor drum; and the obtained multicolor toner image is transferred onto a transfer paper. The essential process of the aforementioned multicolor image formation is disclosed in the official gazettes of Japanese Patent Application Laid Open Nos. 75850/1985, 76766/1985, 95456/1985, 95458/1985, and 158475/1985 which have been applied by the inventors.

In the case of the aforementioned multicolor image forming apparatus in which color images are obtained through the process of registration, a plurality of developing units accommodating different color toners are disposed around the photoreceptor drum, and in general, when the photoreceptor drum is rotated a plurality of times, latent images on the photoreceptor drum are developed to obtain a multicolor image.

Concerning the image forming body, not only the aforementioned photoreceptor drum, on the circumferential surface of which a photoconductor is coated or vapor-deposited, but also a belt-shaped photoreceptor composed of a flexible belt on which a photoconductor is coated or vapor-deposited, is well known. The shape of a belt-shaped photoreceptor (referred to as a photoreceptor belt, hereinafter) is determined when it is provided around rotating rollers including a drive roller. Therefore, the photoreceptor belt is effective in the case where a compact color image forming apparatus is required, utilizing the space effectively. Further, since a small curvature can be applied to the photoreceptor belt, it is effective to separate a transfer sheet from the surface of the photoreceptor belt in such a manner that; a rotating roller of a small diameter is used to guide the photoreceptor belt; and the transfer sheet is separated from the belt when it passes a position in which the curvature of the photoreceptor belt is small. Due to the foregoing, a failure of separation of a transfer sheet can be prevented.

The inventors have further investigated the technique of utilizing the photoreceptor belt. As a result, the following problems have been found.

(1) The problem will be described as follows: When a multiwriting operation is conducted with an optical writing unit in which laser beams are used as exposure beams to form a multicolor image (in other words, when images of various colors are written on the photoreceptor, being superimposed), since the photoreceptor belt is driven by a roller separate from the belt, a relative positional slippage occurs in the longitudinal direction due to the slippage between the photoreceptor belt and the roller and the wear which is caused in the effective diameter of the roller. According to the aforementioned slippage caused in the moving direction of the photoreceptor belt (that is, in the direction of auxiliary scanning), positional slippage occurs, so that the color slippage in the auxiliary scanning direction and deterioration of resolution are caused.

In order to solve the aforementioned problems, the inventors have already applied for various patents. However, the following problem still remains: In the case where the interval time of scanning conducted by exposure beams does not agree with the time obtained when the period of time required for one revolution of the photoreceptor belt is divided by an integer, slippage within one scanning interval (one scanning pitch) is caused when the position of an image of each color is adjusted in the auxiliary direction.

(2) In order to solve the aforementioned problems, it is necessary to improve the mechanical accuracy of the apparatus. However, improvements in mechanical accuracy are not sufficient to solve the problems. Further, the cost of the apparatus would increase when parts of high accuracy are provided. Therefore, there is a limit to the aforementioned countermeasures.

The present invention has been achieved to solve the aforementioned problems. It is a primary object of the present invention to provide an image forming apparatus characterized in that; when multiwriting is conducted, positional slippage of writing is accurately prevented without severely restricting the position of a photoreceptor in the auxiliary direction; color slippage in the auxiliary direction and deterioration of resolution are prevented; and unnecessary writing is not conducted on the photosensitive portion of the photoreceptor.

Another object of the present invention is to provide a color image forming apparatus which can attain the aforementioned object, avoiding complication of the structure of the apparatus.

SUMMARY OF THE INVENTION

The aforementioned object can be accomplished by a color image forming apparatus in which a latent image is formed on a photoreceptor belt by an optical writing unit which conducts primary scanning by deflecting an exposure beam with a rotating polygonal mirror, and auxiliary scanning is conducted by movement of the photoreceptor belt, and in which a multicolor image is obtained when different color toner images obtained through development are superimposed on the photoreceptor belt plural times, characterized in that; prior to a writing operation of said optical writing unit, the period of time required for one revolution of said photoreceptor belt is measured; and the scanning speed is adjusted so that a scanning time interval of said exposure beam agrees with a value obtained when the period of time required for one revolution of the photoreceptor belt is divided by an integer.

The aforementioned object can be accomplished by a color image forming apparatus in which a latent image is formed on a photoreceptor belt when primary scanning is conducted by an optical writing unit in such a manner that the photoreceptor belt is repeatedly scanned by exposure beams with a rotating polygonal mirror and when auxiliary scanning is conducted by movement of the photoreceptor belt, and in which a multicolor image is obtained when different color toner images obtained through development are superimposed on the photoreceptor belt plural times, characterized in that; before said optical writing unit conducts a writing operation, a period of time required for one revolution of said photoreceptor belt is measured; and the rotating speed of said photoreceptor belt is adjusted so that the period of time required for one revolution of said photoreceptor belt can agree with a value obtained when the scanning time interval of the exposure beams is multiplied by an integer.

DETAILED DESCRIPTION OF THE INVENTION

The present invention is to provide a color image forming apparatus that; longitudinal positional slippage of a photoreceptor belt is detected; according to the result of the detection, an optical writing position is corrected correspondingly to the positional slippage; an optical writing unit in which laser beams are utilized as exposure beams, is controlled so that unnecessary writing is not conducted on a photosensitive portion (a portion onto which toner can be adhered) of the photoreceptor belt; and toner images are superimposed when the photoreceptor belt is rotated plural times.

Figure 1:
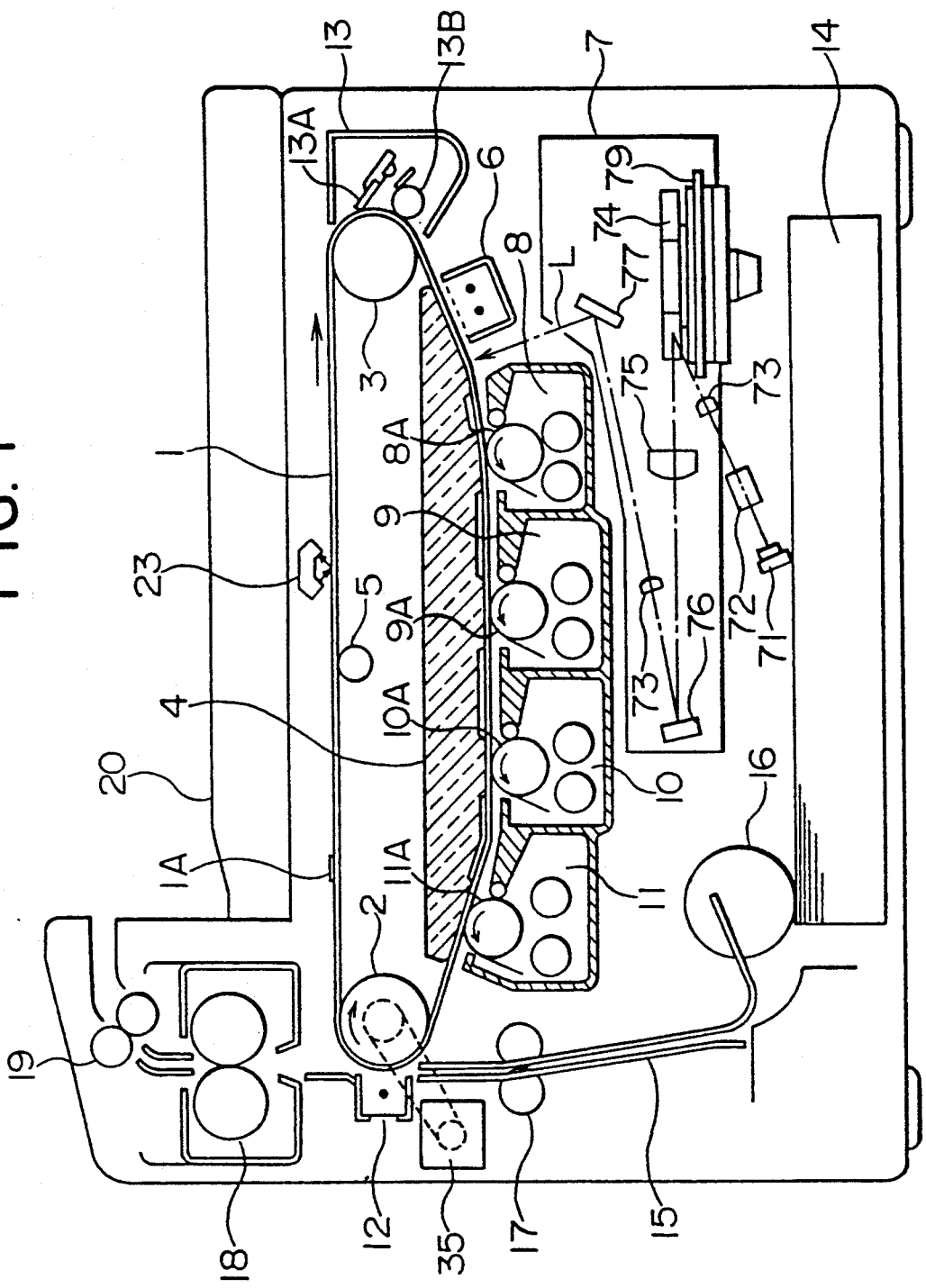
FIG. 1 is a schematic illustration showing the entire structure of a color image forming apparatus to which the present invention is applied.

FIG. 1 shows an example of a color image forming apparatus according to the present invention.

In FIG. 1, numeral 1 is a photoreceptor belt which is a flexible belt-shaped image forming body on which a photoconductor is coated or vapor-deposited. This photoreceptor belt 1 is provided between rotating rollers 2 and 3, and when the rotating roller 2 is driven, the photoreceptor belt 1 is conveyed clockwise. Numeral 1A is a mark made of a coating material or other material having a high reflectance in a specific range, which is provided at a predetermined position on the photoreceptor belt 1. Numeral 4 is a guide member which is fixed to the apparatus body for guiding the photoreceptor belt 1. When tension is given to the photoreceptor belt 1 by the action of a tension roller 5, the internal surface of the photoreceptor belt is slidably contacted with the guide member 4.

Numeral 6 is a scorotron type of charging unit. Numeral 7 is an image exposure section disposed between the charging unit 6 and the developing unit. That is, numeral 7 is an optical writing unit which conducts a writing operation (an exposing operation) with laser beams L. Numeral 8-11 are a plurality of developing means in which developers of specific colors are accommodated. These are disposed in the position where the guide member 4 comes into contact with the photoreceptor belt 1. For example, the aforementioned developing units 8, 9, 10, 11 accommodate developers of yellow, magenta, cyan and black. The developing units 8, 9, 10, 11 are provided with developing sleeves 8A, 9A, 10A, 11A which are disposed in such a manner that a predetermined gap is maintained between them and the photoreceptor belt 1, so that a latent image formed on the photoreceptor belt 1 can be visualized by means of reversal development under a non-contacting condition. This non-contact developing method is advantageous in that the movement of the photoreceptor belt is not obstructed, which is different from a contact-developing method.

Numeral 12 is a transfer unit. Numeral 13 is a cleaning unit. While an image is being formed, a blade 13A of the cleaning unit 13 and a toner conveyance roller 13B are separated from the surface of the photoreceptor belt 1, and only in a cleaning operation conducted after the image has been formed, the blade 13A and the toner conveyance roller 13B are contacted with the surface of the photoreceptor belt 1 with pressure.

Numeral 23 is an optical mark sensor in which an LED is used for a light emitting element and a phototransistor is used for a light receiving element. The position in which the mark sensor 23 is arranged, is not limited to the specific position shown in FIG. 1, and the mark sensor 23 may be disposed anywhere there is a necessary space. Numeral 35 is a DC motor which is used for driving the rotating roller 2 in order to drive the photoreceptor belt 1.

The process of color image formation is carried out by the aforementioned color image forming apparatus as follows: When image data of each color outputted from an image reading unit provided separately from the aforementioned color image forming apparatus, is inputted into optical writing unit 7, laser beams L, generated by a laser diode 71, pass through a collimator lens 72 and a cylindrical 73 lens and are subjected to rotary scanning by a rotary polygonal mirror 74; then laser beams L pass through an fθ lens 75 and another cylindrical lens 73 while the optical path of laser beams L is changed by mirrors 76 and 77; and laser beams L are projected on the circumferential surface of the photoreceptor belt 1 on which a uniform electrical charge is previously given, so that primary scanning is carried out and a bright line is formed.

Exposure (writing) carried out by scanning of laser beams L, is controlled according to a mark detection signal obtained by the mark sensor 23, which will be explained later. Laser beams L modulated according to the image data of the first color, scan the circumferential surface of the photoreceptor belt 1. Consequently, a latent image corresponding to the first color is formed on the circumferential surface of the photoreceptor belt 1 by the action of primary scanning conducted by laser beams L and auxiliary scanning conducted by the conveyance of the photoreceptor belt 1. This latent image is developed by a developing unit 8 loaded with yellow (Y) toner, so that a toner image is formed on the circumferential surface of the photoreceptor belt 1. While the obtained toner image is maintained on the surface of the photoreceptor belt 1, it passes below the cleaning unit 13 which has been separated from the surface of the photoreceptor belt 1. Then, the process advances to the next image forming cycle.

That is, the photoreceptor belt 1 is charged again by the charging unit 6, and image data of the second color outputted from the image data processing section is inputted into the optical writing unit 7, and then the image data of the second color is written onto the circumferential surface of the photoreceptor belt 1 in the same manner as the first color so that a latent image is formed. The latent image is developed by the developing unit 9 loaded with magenta (M) toner.

The magenta (M) toner image is formed under the presence of the yellow (Y) toner image.

Numeral 10 is a developing unit provided with cyan (C) toner, and a cyan (C) toner image is formed on the belt surface according to a control signal generated by the image data processing section.

Numeral 11 is a developing unit provided with black toner, and a black toner image is formed and superimposed on the belt surface in the same manner. DC bias and/or AC bias is impressed upon each sleeve of the developing units 8, 9, 10 and 11, and noncontact developing is conducted by two-component developer which is an image visualizing means, so that the toner image on the photoreceptor belt 1, the base of which is grounded, is developed.

High voltage, the polarity of which is reverse to that of toner, is impressed upon the color toner image formed on the circumferential surface of the photoreceptor belt 1, and the toner image is transferred in the transfer section onto a transfer sheet which has been sent from a paper feed cassette 14 through a paper feed guide 15.

That is, the uppermost transfer sheet in the paper feed cassette 14 is conveyed out from the paper feed cassette 14 by the rotation of the paper feed roller 16, and supplied to the transfer unit 12 through a timing roller 17 in synchronization with image formation conducted on the photoreceptor belt 1.

The transfer sheet onto which an image is transferred, is positively separated from the photoreceptor belt 1, the conveyance direction of which is sharply changed when it is rotated around the rotating roller 2. Then, the transfer sheet is conveyed upward. After that, the image on the photoreceptor belt 1 is fixed by a fixing roller 18, and discharged onto a tray 20 by a discharge roller 19.

After the image has been transferred onto the transfer sheet, the photoreceptor belt 1 is further rotated, and residual toner on the belt is removed by the cleaning unit 13, the blade 13A and the toner conveyance roller 13B of which are contacted with the surface of the belt with pressure. After the cleaning operation has been completed, the aforementioned blade is separated again from the belt surface, and a little after that, the toner conveyance roller 13B is separated so that a new image forming process is started.

In the image forming apparatus of the present invention shown in FIG. 1, the image data writing position can be accurately corrected in such a manner that; a period of time for the photoreceptor belt 1 to be rotated by one revolution is measured from a timing at which a mark sensor 23 detects mark 1A on the photoreceptor belt, and an interval of the signals; and the scanning speed of exposure beams of the optical writing unit 7 is adjusted so that the image data writing position can be corrected. Even when a positional slippage of the photoreceptor belt 1 in the auxiliary scanning direction is caused in the process of latent image formation, color slippage in the auxiliary scanning direction can be prevented due to the foregoing.

Figure 2:
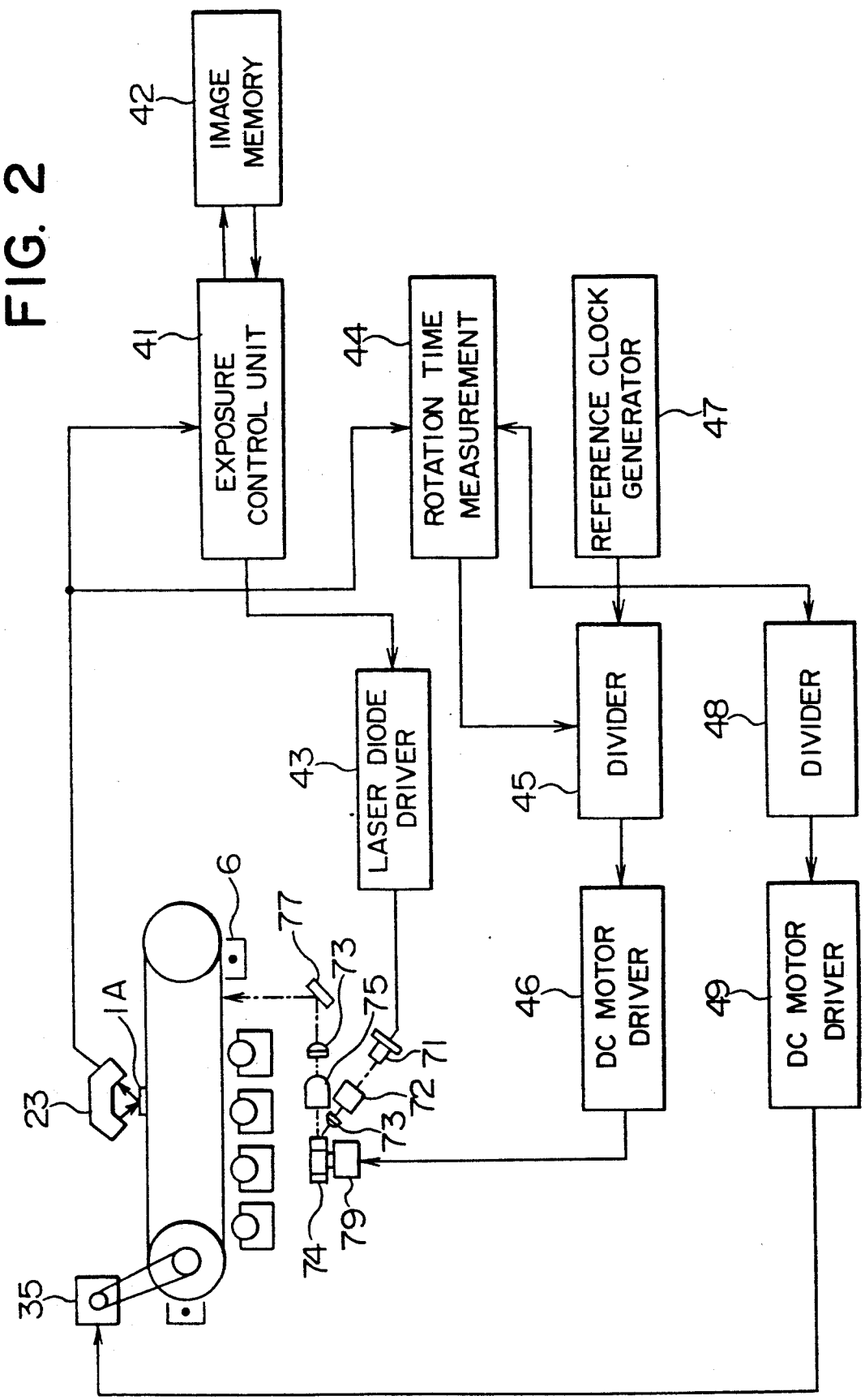
FIG. 2 is a block diagram showing an example of a control circuit which controls the optical writing unit of the present invention.

FIG. 2 is a block diagram showing an example of a control circuit which controls the optical writing unit 7.

Conventionally, in the apparatus mentioned above, correction of a positional slippage in the conveyance direction of the photoreceptor belt 1 is conducted irrespectively of a scanning time interval determined by the rotation speed of a polygonal mirror 74 and a period of time for the photoreceptor belt 1 to be rotated by one revolution. Therefore, an error is caused in the auxiliary direction, wherein the amount of the error is close to scanning pitch P (one pixel) of the maximum exposure beams. Accordingly, the amount of color slippage in the auxiliary scanning direction becomes considerably large. In the case where control is carried out by the circuit shown in FIG. 2, the amount of color slippage in the auxiliary direction can be reduced very small, because the operation is conducted in such a manner that; the exposure starting position for the effective screen range of the photoreceptor belt 1 is calculated according to the signal of the mark sensor 23; at the same time, the period of time required for the photoreceptor belt 1 to be rotated by one revolution is measured; and the scanning speed of exposure beams is adjusted so that the aforementioned scanning time interval can be a value obtained when the aforementioned period of time is divided by a factor of an integer. Further, the amount of color slippage in the auxiliary direction can be also reduced very small, because the operation is conducted in such a manner that; the exposure starting position for the effective screen range of the photoreceptor belt 1 is calculated according to the signal of the mark sensor 23; at the same time, the period of time required for the photoreceptor belt 1 to be rotated by one revolution is measured; and the rotating speed of the photoreceptor belt 1 is adjusted so that the period of time required for the photoreceptor belt 1 to be rotated by one revolution can be a value obtained when the aforementioned scanning time interval is multiplied by a factor of an integer.

When color image formation starts in the circuit shown in FIG. 2, a reference clock pulse is supplied to a belt rotating time measuring section 44, divider 45 and divider 48 from a reference clock generator 47 since the circuit is controlled by a general control section not shown. The dividers 45 and 48 divide the reference clock pulse into a predetermined dividing number, and a pulse signal of a predetermined period is sent to DC motor drivers 46 and 49. DC motor driver 46 drives a polygonal mirror drive motor 79, and DC motor driver 49 drives a belt drive motor 35. Accordingly, the rotating polygonal mirror 74 and the photoreceptor belt 1 are rotated at a predetermined speed. Each time mark 1A on the photoreceptor belt 1 reaches the detecting position of the mark sensor 23, the mark sensor 23 sends a mark detection signal to an exposure control section 41 and a belt rotating time measurement section 44.

In the case where the scanning time of exposure beams is adjusted here, the belt rotating time measurement section 44 measures a period tb of time required for the photoreceptor belt 1 to be rotated by one revolution, according to the mark detection signal. Then, the belt rotating time measurement section 44 changes the number of dividing in such a manner that scanning time interval ts of laser beams L which are exposure beams can be a value obtained when tb is divided by a factor of an integer, and the obtained number of dividing is sent to the divider 45. The divider 45 sends a pulse signal which has been obtained when a reference clock pulse is divided by a designated number of dividing, to DC motor driver 46, so that a polygonal mirror drive motor 79 rotates a rotating polygonal mirror 74 at a rotating speed at which the aforementioned scanning time interval ts can be a value obtained when the aforementioned required time tb for one revolution is divided by a factor of an integer. The exposure control section 41 calculates an exposure (optical writing) start timing from the aforementioned mark detection signal, and reads out image data of color signals stored in an image memory 42, in synchronization with the aforementioned exposure start timing. Then, the pulse width of the color signal is modulated in the exposure control section 41, and the modulated signal is outputted into a laser diode 71 through a laser diode driver 43 so that its light emission can be controlled.

In the case where the rotating time of the photoreceptor belt is adjusted, the belt rotating time measurement section 44 measures a period tb of time required for the photoreceptor belt 1 to be rotated by one revolution, according to the mark detection signal. Then, the belt rotating time measurement section 44 sends a dividing number to the divider 48, wherein the dividing number has been changed so that tb can be a value obtained when ts is multiplied by a factor of an integer. The divider 48 sends a pulse signal to DC motor driver 49, wherein the pulse signal is obtained in such a manner that the reference clock pulse is divided by a designated dividing number. Therefore, the belt drive motor 35 rotates the rotating roller 2 at a changed rotating speed so that the conveyance speed (rotating speed) of the photoreceptor belt 1 can be a value at which tb becomes a value obtained when ts is multiplied by a factor of an integer.

Since the second color and other colors which follows the second color are written in the same manner, the positional slippage of the photoreceptor belt 1 in the auxiliary direction is corrected, so that color images can be correctly superimposed. As compared with a conventional case in which errors, the maximum value of which is one pixel (P), are caused, errors are remarkably reduced in this case. In the manner described above, the positional slippage of multicolor images can be accurately and positively prevented.

Value tb which is a period of time required for the photoreceptor belt to be rotated by one revolution, is measured in the rotating time measurement section 44 by either of the following methods, or by a method made when the following methods are combined.

(a) A period of time required for the photoreceptor belt 1 to be rotated by one revolution is measured.

(b) A period of time required for the photoreceptor belt 1 to be rotated by N revolutions, is measured, and the obtained value is divided by N to find an average value, wherein N is an integer not less than 2.

(c) Measurement is conducted when the electric power source of the color image forming apparatus is turned on, and adjustment of the laser beam L scanning speed is simultaneously conducted, or adjustment of the rotating speed (conveyance speed) of the photoreceptor belt is simultaneously conducted.

(d) Measurement of tb and that of the scanning speed of laser beams L or the rotating speed of the photoreceptor belt, are conducted each time a predetermined number of color images are formed.

(e) Value of tb is measured in the process of exposure conducted by scanning of laser beams L, and the scanning speed of laser beams L or the rotating speed of the photoreceptor belt is adjusted again in the next exposure operation.

As explained above, the following effects can be provided by the present invention.

(1) In the case where a multicolor image is written in a color image forming apparatus in which a belt-shaped photoreceptor is utilized, when an automatic correction mechanism to correct the exposure position is provided, the positional slippage of exposure (writing) can be prevented without severely regulating a positional slippage in the auxiliary scanning direction. Accordingly, color slippage and deterioration of resolution can be positively prevented.

(2) The scanning time interval of exposure beams is adjusted in such a manner that the scanning time interval can be a value obtained when a period of time required for the belt-shaped photoreceptor to be rotated by one revolution is divided by a factor of an integer, or in such a manner that the period of time required for the belt-shaped photoreceptor to be rotated by one revolution can be a value obtained when the scanning time interval of exposure beams is multiplied by an integer. Therefore, errors caused when color images are superimposed can be reduced far smaller than the scanning pitch (corresponding to one pixel) of exposure beams.

(3) Unnecessary writing operations conducted on a photosensitive portion of the photoreceptor can be avoided, so that an exposure and development preventing means can be omitted which prevents exposure and development conducted on the outside of the image region.

(4) It is not necessary to extremely improve mechanical accuracy, so that the increase of cost can be inhibited, and the apparatus can be made compact.

What is claimed is:

1. A color image forming apparatus for forming a color image on a recording sheet, comprising:
   means, having a belt-like shape, for holding a latent image thereon;
   means for rotating said holding means in a longitudinal direction of said holding means;
   means for repeatedly scanning said holding means in a direction perpendicular to said longitudinal direction, with an exposure beam, so that said latent image is formed on said holding means;
   means for developing said latent image with a plurality of color toners;
   means for measuring a rotation time of said holding means; and means for controlling a scanning frequency of said scanning means so that one scanning time of said scanning means is set to the result of dividing said rotation time, while said holding means rotates one revolution, by an integer.

2. The apparatus of claim 1, wherein said measuring means measures said rotation time by averaging said rotation time for at least two rotations of said holding means.

3. The apparatus of claim 1, wherein said measuring means measures said rotation time and said controlling means controls said scanning frequency when said apparatus becomes to an operational status.

4. The apparatus of claim 1, wherein said measuring means measures said rotation time and said controlling means controls said scanning frequency every time when said apparatus forms a predetermined number of said color images.

5. The apparatus of claim 1, wherein said measuring means measures said rotation time of said holding means when said apparatus forms a color image, and said controlling means controls said scanning frequency according to said rotation time when said apparatus forms a next color image.

6. A color image forming apparatus for forming a color image on a recording sheet, comprising;
   means, having a belt-like shape, for holding a latent image thereon;
   means for rotating said holding means in a longitudinal direction of said holding means;
   means for repeatedly scanning said holding means in a direction perpendicular to said longitudinal direction, with an exposure beam, so that said latent image is formed on said holding means;
   means for developing said latent image with a plurality of color toners;
   means for measuring a rotation time of said holding means; and
   means for controlling a rotating speed of said rotating means so that said rotation time, while said holding means rotates one revolution, is set to the result of multiplying one scanning time of said scanning means by an integer.

7. The apparatus of claim 6, wherein said measuring means measures said rotation time by averaging said rotation time for at least two rotations of said holding means.

8. The apparatus of claim 6, wherein said measuring means measures said rotation time and said controlling means controls said rotating speed when said apparatus becomes to an operational status.

9. The apparatus of claim 6, wherein said measuring means measures said rotation time and said controlling means controls said rotating speed every time when said apparatus forms a predetermined number of said color images.

10. The apparatus of claim 6, wherein said measuring means measures said rotation time of said holding means when said apparatus forms a color image, and said controlling means controls said rotating speed according to said rotation time when said apparatus forms a next color image.

* * * * *